Dec. 20, 1960 D. E. WILCOX 2,964,949
INDUCTION VELOCITY METER
Filed Oct. 12, 1956 3 Sheets-Sheet 1

INVENTOR.
DOYLE E. WILCOX
BY *Frederic B. Schramm*

ATTORNEY

Dec. 20, 1960
D. E. WILCOX
2,964,949
INDUCTION VELOCITY METER
Filed Oct. 12, 1956
3 Sheets-Sheet 2
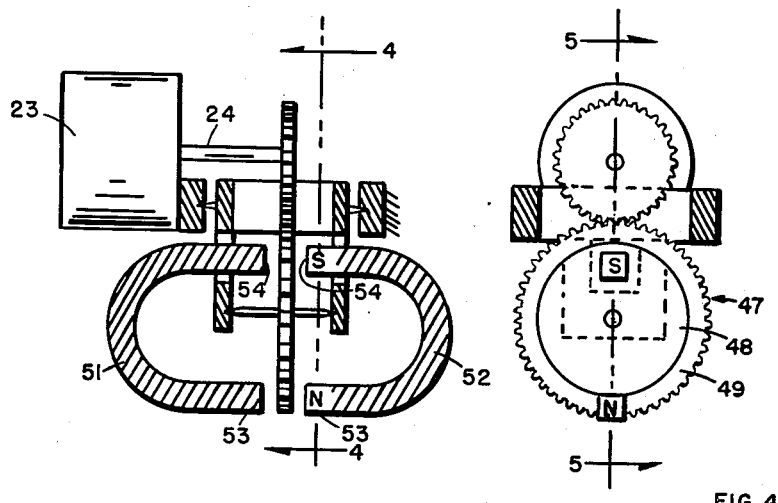
FIG. 5
FIG. 4
DIRECTION OF TRAVEL
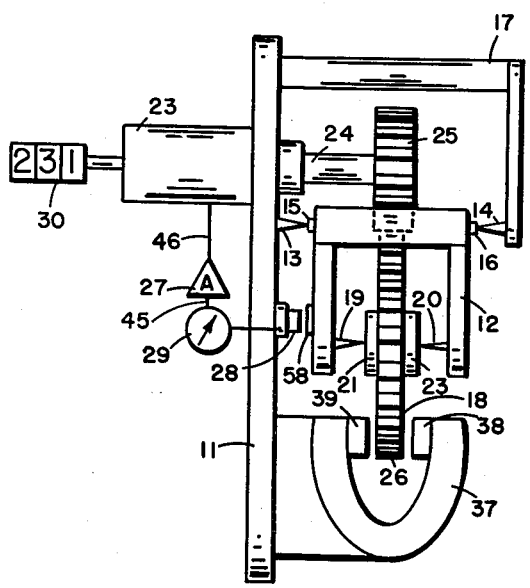
FIG. 3
INVENTOR.
DOYLE E. WILCOX
BY
*Frederic B. Schramm*
ATTORNEY Dec. 20, 1960     D. E. WILCOX     2,964,949
INDUCTION VELOCITY METER
Filed Oct. 12, 1956     3 Sheets-Sheet 3

INVENTOR.
DOYLE E. WILCOX
BY *Frederic B. Schramm*
ATTORNEY

United States Patent Office 2,964,949
Patented Dec. 20, 1960

2,964,949
INDUCTION VELOCITY METER

Doyle E. Wilcox, Puente, Calif., assignor to North American Aviation, Inc.

Filed Oct. 12, 1956, Ser. No. 615,629

20 Claims. (Cl. 73—497)

This application relates to motion indicators and concerns particularly apparatus for measuring absolute motion, velocity and acceleration.

In the operation and control of conveyances, such as ships and aircraft which have no contact with a solid medium such as the ground, the measurement and determination of absolute motion such as distance traveled and absolute velocity and acceleration, that is ground speed and acceleration with respect to ground, have not been capable of direct determination. Relative distance, speed and acceleration indicators have required an estimate to be made of the speed and direction of the medium within which the conveyance is flying or sailing in order to compute absolute distance traveled, velocity and acceleration. Nevertheless, for purposes of navigation and control, for commercial and other reasons, measurement of the absolute values is desirable and useful.

Although devices of various types have been proposed for providing indications of absolute acceleration, problems have been encountered of avoiding instantaneous and accumulated errors due to friction and other unavoidable difficulties such as necessity for making flexible connections and the like.

It is accordingly an object of the invention to provide a reliable accurate apparatus for measuring absolute distance traveled, or velocity and acceleration, which is very light in weight, useful on small craft, which avoids the necessity for magnetic acceleration sensing elements, and which requires no flexible electrical conductors or other connections for transmitting energy or output signals to or from a relatively movable element.

Still another object of the invention is to provide apparatus in which any unavoidable friction torques about the spin axis of a sensing element do not contribute directly to errors in measurement.

Moreover, it is a further object of the invention to provide an apparatus in which the output shaft may drive a load without producing errors.

Other and further objects, features and advantages of the invention will become apparent as the description proceeds.

In carrying out the invention in accordance with a preferred form thereof, a pendulously mounted cradle is provided which carries a rotatable member, such as an induction disc, and a motor or other driving means is provided for applying a rotational force to the disc. In a preferred form of the apparatus, rotational force is applied to the disc through gearing consisting of a fine toothed pinion on a motor shaft meshing with fine teeth on the periphery of the rotatable induction disc and the pitch line or point of contact between the pinion and the teeth of the gear disc lies in the pivot axis of the pendulous cradle. A motor control is provided which causes the rotational force applied by the motor to the rotatable induction disc to increase with deflection of the cradle in a direction such as to maintain the cradle in the null or zero-acceleration position. A register, counter, or the like, is provided for giving a response or providing a measurement of the number of rotations of the disc. For measuring absolute distance traveled, or the second integral of acceleration, the apparatus is employed without means for retarding the rotation of the disc. However, for the measurement of velocity an induction type rotation retarder, such as a braking magnet, is employed in which the retarding force is proportional to the velocity of rotation of the induction disc. It is understood that in the proposed applications of this invention as an integrating accelerometer for the measurement of velocity or distance, a mounting platform must be provided which will keep the acceleration sensing axis aligned in the desired direction and any component of gravitational acceleration along the sensing axis must be neutralized.

A better understanding of the invention will be afforded by the following detailed description considered in conjunction with the accompanying drawings in which Fig. 1 is a view in perspective of an embodiment of the invention serving as an integrating accelerometer or velocimeter;

Fig. 3 is an elevation of the apparatus of Fig. 1;

Figs. 4 and 5 are views in elevation from the front and side of a modification of the apparatus in Fig. 1 arranged to provide compensation for temperature errors;

Figure 8:
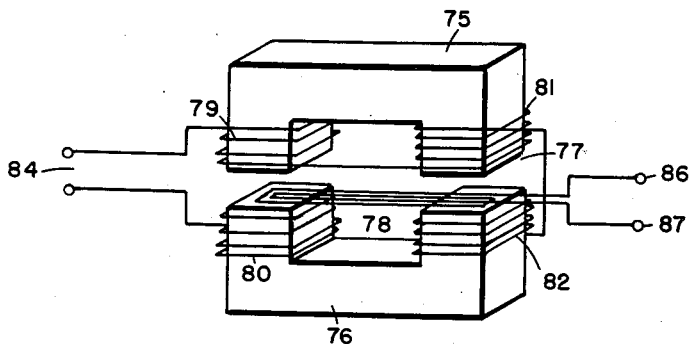

And Fig. 8 is a schematic diagram of still another type of pickoff unit which is of the electromagnetic induction type.

Like reference characters are utilized throughout the drawings to designate like parts.

Figure 1:
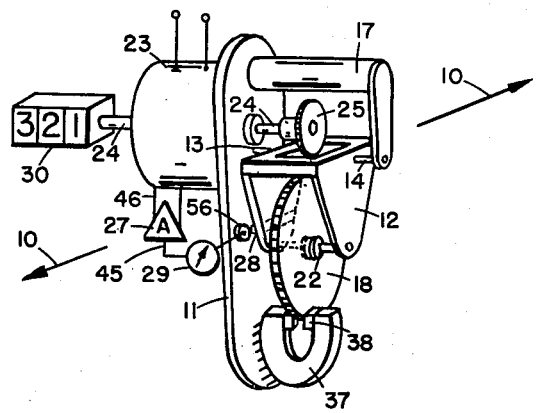

Referring to Figs. 1 and 3 of the drawing, an inertially stabilized normally-vertical or normally-horizontal plane base plate 11 is provided which is arranged to be secured to a vehicle or conveyance. The sensitive axis of the device is along line 10 which is perpendicular to the pivotal axis of the cradle 12 and also perpendicular to the vertical direction in which the cradle 12 hangs from its pivotal axis.

Cradle 12 is pendulously mounted by means of a low friction mounting such as inwardly extending hardened steel pivot points 13 and 14 cooperating with jewel bearings 15 and 16, respectively, such as natural or synthetic sapphire, for example, of the type utilized in watt-hourmeters and the like. One possible arrangement is such that the cradle 12 hangs vertically and experiences a torque about the axis of pivots 13 and 14 when the vehicle accelerates either forward or backward along the line 10. It is to be understood that suitable means are provided for securing pivot points 13 and 14 to the base plate 11, such as a bracket 17 carrying the pivot point 14, the pivot point 13 in the form of apparatus illustrated being secured to the base plate 11.

A rotatable member taking the form of an induction disc 18 is rotatably mounted at the lower portion of the cradle 12 by suitable means such as a spindle riding in jeweled bearings. If desired, stationary hardened pivot points 19 and 20 may be provided with sapphire jewel bearings 21 and 22, or the like, being secured to the rotating disc 18 for cooperation with the pivot points 19 and 20 to enable the disc 18 to rotate freely and with little friction.

For the purpose of minimizing power requirements and errors in the output and enabling the apparatus to be built very light, low friction bearings are preferably employed both for the cradle pivot mounting and the disc rotation mounting. Nevertheless, any friction in the rotation of the disc 18 introduces no error and has no effect on the measurement. Friction or other spurious torque on the cradle pivot axis 13 and 14 will induce error in the output of the instrument. It is, therefore, desirable that the friction level about the cradle pivots be very low. In those applications requiring extreme accuracy it is necessary that the cradle pivots be pressure-fed with gas or liquid, and must be designed to completely float the cradle without coulomb friction.

Figure 2:
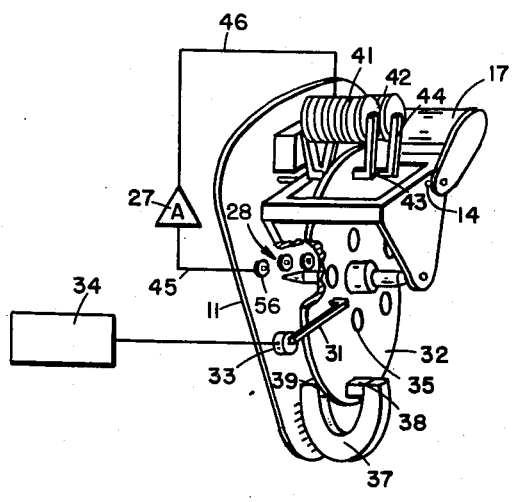
Fig. 2 is a view in perspective of a modification of the apparatus of Fig. 1 in which a rotational force is applied to the indication disc directly instead of through a motor or gearing and which is arranged as a velocity meter.

Rotational force is applied to the disc 18. In the embodiment of Figs. 1 and 2 the force is applied mechanically. A two-phase motor 23 is provided which is secured to the base plate 11 having a shaft 24 extending through the base plate 11 and a pinion 25 meshing with gear teeth 26 cut in the periphery of the disc 18. Preferably, the teeth of the pinion 25 and the gear teeth 26 are very fine so as to induce relatively low friction and require little driving power.

A current source represented by the output of a schematically represented amplifier 27 is provided for energizing the two-phase, reversible motor 23. The amplifier input is controlled in response to deflection of the cradle 12 so that in the preferred arrangement the rotational force is proportional to the deflection of the cradle 12. Preferably means are provided for indicating or responding to the deflections which do not load the cradle 12. For example, an inductive type of pickoff 28, further illustrated in Fig. 6, may be provided which generates a voltage proportional to the deflection of the cradle 12. Suitable means, such as a galvanometer or millivoltmeter 29 may be included in the input connection of the amplifier 27 or elsewhere in the circuit in order that indications may be obtained, if desired, of the magnitude of the cradle deflection.

Suitable means, such as a conventional register 30 on the shaft of the motor 23, are provided for indicating the total number of revolutions of the disc. The disc revolution counter may also take the form illustrated in Fig. 2 consisting of an electromagnetic yoke 31 straddling the disc 32 and having a coil 33 connected to a pulse counter or register 34. For this type of register the induction disc 18 of Fig. 1 is modified by providing openings 35 which induce impulses when they pass under the pole pieces of the yoke 31, the impulses being counted by the register 34.

In order to cause the apparatus to indicate absolute distance traveled, no means for resisting rotation of the disc 18 or 32 would be provided. However, in order to cause the apparatus to function as a velocimeter or accelerometer a drag magnet 37 is provided having pole pieces 38 and 39 on either side of the induction disc 18 or 32. It will be understood by those skilled in the art that magnetic flux produced by the drag magnet 37 and intersecting the disc 32 results in eddy currents being induced in the disc 18 or 32 when it rotates so as to produce a retarding force which is proportional to the rotational speed of the disc 18 or 32. It will be seen that the rotational drive force, applied directly to the disc by gear 25, is actually transmitted to the cradle 12 at the disc pivot axis 19—20 as a reaction force on the cradle in such a direction as to cause the cradle to rotate about its pivot axis 13—14 so as to minimize the signal from pickoff 28. Thus, this reaction force together with the drag of the magnet (when the latter is used) tend to maintain the cradle in null position.

The force acting upon an object to accelerate it is proportional to the acceleration. In the arrangement as described the deflection of the cradle 12 is also proportional to the force of acceleration acting thereon because the balancing opposing force of the drag magnet is proportional to disc speed which is made proportional to deflection. Consequently, the deflection indicator 29 serves as an indicator of the acceleration. The rotating disc rotates at a speed proportional to the deflection and consequently its speed is also proportional to the acceleration; and the disc serves as an integrating device in that the number of revolutions which it has made at any given instant as recorded by the register 30 or 34 serves as an indication of the velocity of the disc plate 11 along the line 10. With variations in acceleration, as the deflection of the cradle 12 diminishes or reverses in cases of reverse acceleration the rotation of the disc 18 or 32 changes or reverses so that the reading of the register 30 or 34 indicates at all times accumulated effects of variations in acceleration and, therefore, indicates the velocity at the instant.

As shown in Figs. 1 and 2, the drag magnet 37 is secured to the base plate 11 in a suitable manner as by welding, for example, so that its position is fixed relative to the base plate 11 and the cradle 12 deflects with respect to the drag magnet 37. In consequence, the reaction of the magnetic flux produced by the drag magnet 37 and the disc 32 or 18 acts in such a direction as to oppose the deflection of the cradle caused by the forces of acceleration. It is to be understood that the connections from the pickoff 28 to the amplifier 27 and the motor 23 are such that where acceleration takes place in one direction or the other the direction of rotation of the disc 32 is such as to produce a force opposing that of acceleration. The gain or amplification of the torque feedback loop comprising the pickoff 28, amplifier 27 and motor 23 is made very large for all modes of operation of the instrument so that the deflection of the cradle 12 from its null position is extremely small. In practical applications the maximum deflection under conditions of maximum acceleration input will generally be less than one milliradian.

Since the energy required for rotating the disc 18 is provided by the motor 23 which in turn is energized by the amplifier 27, and the frictional energy such as the negligible friction losses of the gearing 25 and 26 and pivot bearings 21 and 22 of the disc 26 are also supplied by the motor 23, the frictional losses do not affect the deflection of the cradle 12 and therefore do not introduce any errors in the reading of acceleration or velocity, nor in case the drag magnet 37 is omitted, in the reading of absolute distance.

When the drag magnet 37 is omitted and the register 30 is caused to act as an indicator of distance traveled, the cradle 12 deflects in response to changes in velocity, and the voltage applied to the motor 23 through the pickoff 28 and the amplifier 27 increases in proportion to the deflection. Therefore, the rotational speed of the disc 18 or 32 is proportional as before to deflection of the cradle which in this case is subject to only the retarding force due to the disc drive force applied by the gear 25 to the disc and transmitted by the latter to the cradle at the disc bearings.

The deflection of the cradle 12 tends to increase progressively in time at a rate proportional to acceleration so that the deflection of the cradle 12 constitutes an integration of the acceleration force. Since velocity is the time integral of acceleration, the deflection of the cradle 12 is thus proportional to velocity and the reading of the number of revolutions made by the disc 32 or 18 constitutes an integration of velocity providing a measure of absolute distance traveled. Reversals in direction of movement cause backward counting of the register 30 or 34 so that its reading at any instant represents absolute position in space of the apparatus with respect to motion parallel to the base plate 11 and perpendicular to its vertical axis along the line 10, provided the effects of gravity are properly neutralized, as previously explained (by stabilizing the device so that no component of gravity acts to deflect the pendulous cradle).

A rotational force may be applied to the induction disc directly and without the imposition of gearing or other connecting means. As shown in Fig. 2, means may be provided for subjecting the disc 32 to a shifting or rotating polyphase magnetic field for causing rotation thereof. For example, an alternating-current magnet may be utilized with pole faces on either side of the disc 32 and a lag coil or other phase splitting means to produce a shift in phase of magnetic flux; or, as illustrated in Fig. 2, a two-phase electromagnetic unit or induction motor stator may be utilized comprising two field coils 41 and 42 with magnetic cores 43 and 44, respectively, straddling the induction disc 32 and spaced slightly along the periphery thereof so that a rotating magnetic field effect is produced with the flux later in time phase acting at a separated portion of the periphery of the disc 32.

The coils 41 and 42 and cores 43 and 44 are secured to the base plate 11 so that no flexible electrical leads are required. Preferably the magnetic cores 43 and 44 are so positioned that the pole faces lie on either side of the axis formed by the line through the pivot points 13 and 14 so as to minimize any output error due to frictional forces developed at the axis of rotation of the disc.

For simplicity in the schematic diagrams single lines 45 and 46 have been shown in Figs. 1 and 2 to represent cables carrying electrical connections from the pickoff 28 to the amplifier 27 and to the motor 23 and the electromagnetic flux shift unit 41—44. It will be understood that the line 46 represents a cable carrying polyphase conductors to the unit 41—44 from the amplifier 27. The amplifier 27 is in this case of the type having a polyphase output.

The scale factor of the instrument, which is defined as the ratio of the counting rate of the output register 30 to the input acceleration component along the sensing axis 10, is a function of the flux density established by the drag magnet 37 and the resistivity of the induction disc 18 or 32. As both of these quantities are, in general, variable with temperature it is necessary to provide temperature compensation in those applications requiring high stability and accuracy. Conventional means for compensating permanent magnets by means of negative-coefficient shunts may be employed. Compensation for the disc resistivity may be accomplished by choosing a disc material having a low temperature coefficient, such as manganin or constantin alloys, or by means of the configuration described below. Another approach to the overall temperature compensation problem is to cause the pendulosity, or net unbalance of the cradle 12 about the axis of pivots 13 and 14 to vary with temperature such as to stabilize the scale factor. This could be accomplished, for example, by attaching a balance weight to the cradle by means of a properly designed bimetallic lever arm so that the net pendulosity of the cradle will vary correctly with temperature.

If the apparatus is to be subjected to wide variations in temperature the effect thereof may be avoided by employing an induction disc unit 47 of the type illustrated in Figs. 4 and 5. The unit 47 has a portion of one temperature coefficient of resistance and another portion of a different temperature coefficient of resistance.

The induction disc unit 47 employed in the apparatus of Figs. 4 and 5 comprises an inner portion 48 composed of a copper and an outer ring 49 composed of brass, for example. The inner copper portion 48 has a larger temperature coefficient of permeability but less effect with regard to the retarding force of the drag magnets because of smaller radius. In this case, two drag magnets 51 and 52 are employed having a lower set of pole pieces 53 straddling the outer ring or brass portion 49 of the induction disc unit 47 and an upper set of pole pieces 54 straddling the inner portion or copper part 48 of the induction disc unit 47.

Consequently, as the temperature rises and the retarding effect of the flux between the pole pieces 53 diminishes owing to the increased resistance of the brass outer ring 49, the retarding effect of the flux between the pole pieces 54 falls off more rapidly because of the higher temperature coefficient of resistance of the copper portion 48. However, the pairs of pole pieces 53 and 54 are on opposite sides of the center of rotation of the disc unit 47 so that their fluxes act oppositely with respect to tilting or deflection of the cradle 12 around its pivot axis. The rotation disc portion 48 acting upon the flux between the pole pieces 54 actually aids the deflection of the cradle produced by the acceleration force, but not sufficiently to overcome the effect of the flux between the pole pieces 53.

For full temperature compensation, the relative thicknesses of the ring portion 49 and the inner portion 48 of the induction disc unit 47 are so chosen that the torques of the drag forces acting in the two portions are inversely proportional to the temperature coefficients of resistivity. Consequently, one change in the retarding effect by variations in temperature is balanced by the other. Assuming temperature coefficients of resistivity of brass and copper approximately .002 and .004, respectively, per degree centigrade or a ratio of 1:2, if the radius of action in the brass is twice that on the copper the brass ring must be sufficiently thick to provide the same opposing force.

Figure 6:
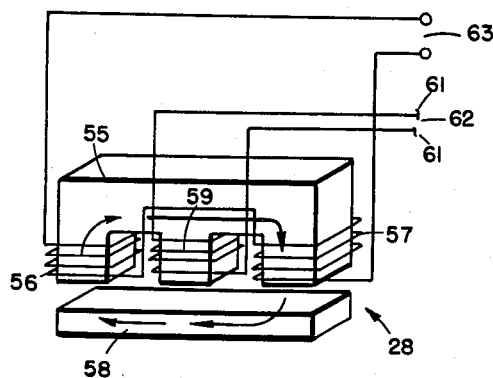
Fig. 6 is a schematic diagram illustrating the type of pickoff or cradle-deflection-responsive element employed in the apparatus of Figs. 1–5.

Fig. 6 represents schematically a type of balanced pickoff element 28 or deflection-sensing unit which may be used in the apparatus of Figs. 1–3. As seen, there is a stationary core member 55, in the form of an E, secured to the base plate 11 of the apparatus. Differentially connected pickoff coils 56 and 57 are provided on the outer legs of the E. A movable armature 58 is secured to the cradle 12, and there is a magnetizing, center-leg coil 59 for connection to a source of alternating current excitation 62 having terminals 61. It will be apparent that as the armature 58 is deflected longitudinally with respect to itself in either direction, fluxes in the core 55 will become unbalanced and a voltage will be induced at terminals 63 constituting input terminals of the amplifier 27. The magnitude of the input signal to the amplifier 27 is thus made proportional to the displacement of the armature 58 from its central position and therefore proportional to the deflection of the cradle 12. The phase relationship of the voltage appearing at the coil terminals 63 will be reversed by reversal in deflection of the cradle 12 so that the motor 23, a two-phase motor, is caused to run in whichever direction is necessary to oppose acceleration and deflection of the cradle 12.

Figure 7:
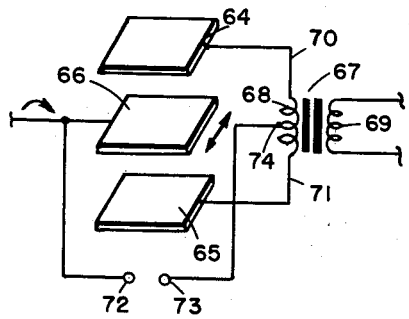
Fig. 7 is a schematic diagram of a modified type of pickoff means of the electrostatic type.

Although an electromagnetic type of pickoff has been illustrated in Figs. 1–3 and 6, it is to be understood that the invention is not limited thereto and does not exclude the use of an electrostatic pickoff such as illustrated in Fig. 7. There are plates 64 and 65 secured to the base member 11 and an intermediate movable center plate 66 secured to the deflecting cradle 12. The plates 64 and 65 are connected in a differential device represented by a transformer 67 having windings 68 and 69. End terminals 70 and 71 of the winding 68 are connected to the plates 64 and 65, respectively. Terminals 72 and 73 of a source of high-voltage alternating current are connected to the plate 66 and a center tap 74 of the winding 68. In consequence, deflection of the plate 66 unbalances the circuit of the center tapped transformer winding 68 and causes a voltage to be induced in the secondary winding 69 of the output transformer which depends in phase and magnitude upon the relationship of the sensing electrostatic plate 66 to the stationary electrostatic plates 64 and 65.

In Fig. 8 another form of inductive pickoff is illustrated in which there are stationary cores 75 and 76 and an air gap 77 therebetween for a deflecting coil 78 which is connected to the deflecting cradle 12. The cores 75 and 76 carry excitation windings 79, 80, 81 and 82 connected in series aiding relation to a pair of terminals 84 adapted to be connected to a source of alternating current. The pickoff coil 78 detects deflection and, if desired, controls the apparatus affecting the speed of the induction discs 18 or 32.

It is to be understood that if the drag disc is employed, output terminals 86 and 87 of the deflecting coil 78 are connected to suitable input terminals such as those of the amplifier 27 which controls the motor 23 serving to apply a rotational force to the induction disc. In this case also the deflecting coil 78 produces an indicating E.M.F., which is independent of mechanical variations in the apparatus of Figs. 1–7. The windings 81 and 82 are so connected in relation to the windings 79 and 80 that the voltage induced in the coil 78 reverses in phase as the coil 78 is moved to the right or left from a symmetrical center position.

It will thus be apparent that an apparatus has been provided which may be rendered responsive to distance traveled or absolute position in space, or absolute velocity or acceleration, and which is independent of estimates of the speed and direction of motion of a medium in which a vehicle or conveyance may be traveling.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electromechanical device comprising in combination, a base, a pivotable element, a rotatable element, means mounting said rotatable element to said pivotable element for rotation about a first axis, means mounting said pivotable element to said base for pivotal motion about a second axis spaced from said first axis, means for detecting the deflection of said pivotable element relative to said base about said second axis, motor means responsive to said means for detecting, said motor means connected to cause said rotatable element to rotate about said first axis, said motor means located to apply a force to said rotatable element along a line spaced from said first axis a distance substantially equal to the distance between said axes.

2. An electromechanical device comprising in combination a base, a pivotable element, a rotatable element, means mounting said rotatable element to said pivotable element for rotation about a first axis, means mounting said pivotable element to said base for pivotal motion about a second axis spaced from said first axis, means for detecting the deflection of said pivotable element relative to said base about said second axis, motor means responsive to said means for detecting, said motor means connected to cause said rotatable element to rotate about said first axis, said motor means located to apply a force to said rotatable element along a line intersecting said second axis, and means for retarding rotatable element in accordance with rotational velocity thereof.

3. An electromechanical device comprising in combination, a base, a pendulous element, means mounting said element to said base for motion about a pivot axis, a rotatable conductive disc, means mounting said disc to said element for rotation about a second axis spaced from said pivot axis, means for detecting the deflection of said pendulous element about said pivot axis, motor means responsive to said means for detecting, said motor means connected to cause said disc to rotate, said motor means located to actuate said disc substantially along a line intersecting said pivot axis, and magnetic damping means fixedly mounted with respect to said rotatable disc and cooperatively associated therewith so as to provide velocity damping.

4. An induction velocity indicator comprising in combination a driving motor, a cradle pendulously mounted on a pivot axis, an induction disc rotatably mounted in said cradle on an axis spaced from said pivot axis, said motor having a shaft and gearing interconnecting the induction disc and the motor shaft with a point of contact substantially in the pivot axis of said cradle, a stationary drag magnet for retarding rotation of the induction disc, means responsive to deflection of the cradle for driving the motor in one direction or the other according to direction of deflection of the cradle; and means responsive to rotation of the induction disc for providing an output indicative of the rotation of said disc.

5. An induction velocity meter comprising in combination a cradle pendulously mounted on a pivot axis, an induction disc rotatably mounted in the cradle on an axis spaced from said first mentioned axis, means for retarding rotation of the induction disc, means for applying a rotational force to the induction disc, means responsive to deflection of the cradle for generating a signal indicative of such deflection, and means responsive to said signal for controlling the direction of said disc rotational force whereby the extent of rotation of the disc indicates magnitude and direction of velocity.

6. An induction velocity meter comprising in combination a motor having a shaft carrying a pinion, a cradle pendulously mounted on a pivot axis parallel to the motor shaft and extending through the pitch line of the motor pinion, an induction disc having gear teeth thereon meshing with the motor pinion, the disc being rotatably mounted in said cradle, a magnet with a mounting fixed in relation to the disc for retarding rotation thereof, a pick-up device responsive to deflection of the cradle in one direction or another for producing a signal, means for driving the motor in one direction or another according to the signal produced by said pick-up device and a register responsive to rotation of said induction disc for integrating acceleration forces acting upon the cradle and disc and indicating velocity at any given instant.

7. A velocity meter as in claim 6 wherein the induction disc is composed of radially inner and outer portions comprised of materials having different temperature coefficients of electrical resistance and the magnet comprises a magnet with pole pieces on diametrically opposite sides of the disc with one pole piece in relation to the portion of the disc having one temperature coefficient of electrical resistance and the other pole piece in relation to the portion of the disc having another temperature coefficient of electrical resistance whereby a differential effect is introduced and ambient temperature variations are compensated.

8. A velocity indicator comprising in combination a driving motor, a cradle pendulously mounted on a pivot axis, an induction disc comprising an outer ring of brass and an inner portion of copper with a rotatable mounting in said cradle spaced from said pivot axis, said motor having a shaft, and gearing interconnecting the induction disc and the motor shaft with a point of contact substantially in the pivot axis of the cradle, a stationary drag magnet with pole faces on diametrically opposite sides of the disc with one pole face in inductive relation to the copper portion of the disc and the other pole face in inductive relation to the brass portion of the disc.

9. An electromechanical device comprising in combination a base, a support pendulously mounted to said base on a pivot axis, an induction disc rotatably mounted on said support for rotation about an axis spaced from said pivot axis, inductive means for opposing rotation of the disc to oppose deflection of the support relative to said base about said pivot axis, means for rotating the disc in response to deflection of the support and means for indicating the magnitude of said deflection.

10. In combination, a cradle pendulously mounted on a pivot axis, an induction disc comprising an outer ring composed of a first material having a predetermined temperature coefficient of resistivity and an inner portion composed of a second material having a different temperature coefficient of resistivity, said disc being journalled in said cradle on an axis of rotation spaced from said pivot axis, means for rotating the disc, a drag magnet with pole faces on opposite sides of the axis of rotation of the disc with one pole face in inductive relation to the first disc material and the second pole face in inductive relation to the second disc material.

11. In combination, a base, a cradle pendulously mounted on said base for motion about a pivot axis, an induction disc rotatably mounted in the cradle for rotation about an axis spaced from said pivot axis, means for rotating the disc in response to deflection of the cradle relative to said base about its pivot axis, and a drag magnet for applying a retarding force to the rotation of the disc whereby deflection of the cradle about its pivot axis is opposed.

12. In combination, a cradle pendulously mounted on a pivot axis, an induction disc comprising an outer ring composed of a first material having a predetermined temperature coefficient of resistivity, an inner portion composed of a second material having a different temperature coefficient of resistivity, said disc being journalled in said cradle on an axis of rotation spaced from said pivot axis, means for rotating the disc, a drag magnet with pole faces on opposite sides of the axis of rotation of the disc with one pole face in inductive relation to the first disc material and a second pole face in inductive relation to the second disc material, the two disc materials having temperature coefficients of resistivity inversely proportional to the ratio of the radii of action of the magnet pole faces inductively related to said disc material.

13. In combination, a base, a cradle pendulously mounted to said base on a pivot axis, a disc rotatably mounted in the cradle for rotation about an axis spaced from and substantially parallel to said pivot axis, pick-off means for generating a signal in accordance with deflection of said cradle relative to said base about its pivot axis, means responsive to said pickoff means for applying rotational force to the disc in response to deflection of said cradle about its pivot axis, and means for opposing rotation of the disc whereby a force is produced opposing deflection of the cradle.

14. Apparatus as in claim 13 wherein means are provided responsive to rotation of the disc for integration of deflective forces acting thereon.

15. In combination, a base, a cradle pendulously mounted to said base on a pivot axis, an induction disc rotatably mounted in said cradle for rotation about an axis spaced from said pivot axis, a plurality of electromagnetic means mutually differing in time and space phase for inducing rotational force in the disc, means for detecting deflection of said cradle relative to said base, means responsive to said detecting means for controlling said electromagnetic means, and means for opposing rotation of the disc whereby a force is produced opposing deflection of the cradle.

16. Apparatus as in claim 15 wherein a register is provided responsive to rotation of the disc for integrating deflection force acting thereon.

17. Apparatus as in claim 15 in which means responsive to deflection of the cradle are provided for providing an indication of acceleration.

18. In combination, a cradle pendulously mounted on a pivot axis, an induction disc comprising an outer ring composed of a first material having a predetermined temperature coefficient of resistivity at a given thickness, the inner portion of said disc composed of a second material having a different temperature coefficient of resistivity and at a given thickness, said disc being journalled in said cradle on an axis spaced from said pivot axis, means for rotating the disc, a drag magnet with pole faces on diametrically opposite sides of the disc with one pole face in inductive relation to the first disc material and second pole face in inductive relation to the second disc material, whereby rotation of the disc is subjected to opposing torques by the induction relation between the disc materials and the pole faces, the two disc materials having temperature coefficients of resistivity inversely proportional to the torques produced by the inductive relation between the pole faces upon the disc materials.

19. A device of the class described comprising a base, support means mounted to said base on a first pivot axis, a rotatable member journalled in said support means on a second pivot axis spaced from said first axis, means for detecting deflection of said support means relative to said base about said first pivot axis, and feedback means including said member and responsive to said detecting means for torquing said support means about said first pivot axis in a sense to decrease said detected deflection, said feedback means comprising means for applying a rotational driving force to said member.

20. A device of the class described comprising a base, a support eccentrically pivoted to said base on a pivot axis, a first member journalled in said support for rotation about an axis spaced from said pivot axis, a second member fixed to said base, one of said members comprising a conductive element, the other of said members comprising means for providing a magnetic field in and about said one member to induce eddy currents in said one member in response to relative rotation of said members, means for detecting displacement of said support about said pivot axis thereof, and motor means responsive to said detecting means for rotating said first member in accordance with displacement of said support about said pivot axis thereof.

References Cited in the file of this patent

UNITED STATES PATENTS

| Re. 22,919 | McNatt | Sept. 23, 1947 |
| 1,228,061 | Schuler | May 29, 1917 |
| 1,840,001 | Tsujita | Jan. 5, 1932 |
| 2,417,689 | Johnson | Mar. 18, 1947 |
| 2,421,285 | Prince | May 27, 1947 |
| 2,429,612 | Curry | Oct. 28, 1947 |
| 2,523,419 | Budack | Sept. 26, 1950 |
| 2,622,865 | Sundt | Dec. 23, 1952 |
| 2,672,334 | Chenery | Mar. 16, 1954 |

FOREIGN PATENTS

| 124,318 | Great Britain | Mar. 27, 1919 |
| 271,175 | Great Britain | May 23, 1927 |
| 404,303 | Great Britain | Jan. 11, 1934 |